Feb. 25, 1969 MASAYOSHI FURUICHI 3,429,578

HEAD SWITCHING APPARATUS OF A TAPE RECORDER

Filed April 26, 1967

INVENTOR.
MASAYOSHI FURUICHI
BY
H. Edward Masters

United States Patent Office 3,429,578

Patented Feb. 25, 1969

3,429,578

HEAD SWITCHING APPARATUS OF A TAPE RECORDER

Masayoshi Furuichi, Tokyo-to, Japan, assignor to Kabushiki Kaisha Sankei Seisakusho, Tokyo-to, Japan, a joint-stock company of Japan Filed Apr. 26, 1967, Ser. No. 633,768
Claims priority, application Japan, May 6, 1966 (utility model), 41/41,960
U.S. Cl. 274—4 5 Claims
Int. Cl. G11b 5/52

ABSTRACT OF THE DISCLOSURE

A single combined cam and ratchet adapted to switch the position of a sound recording and/or reproducing head from one track to the other on a sound recording tape is provided with a plurality of cam surfaces of different radial height and a plurality of notches each provided between a pair of adjacent cam surfaces. A pawl cooperates with the notches to rotate stepwise the wheel while a cam follower cooperates with the cam surfaces to switch the position of the head.

Figures 1, 2:
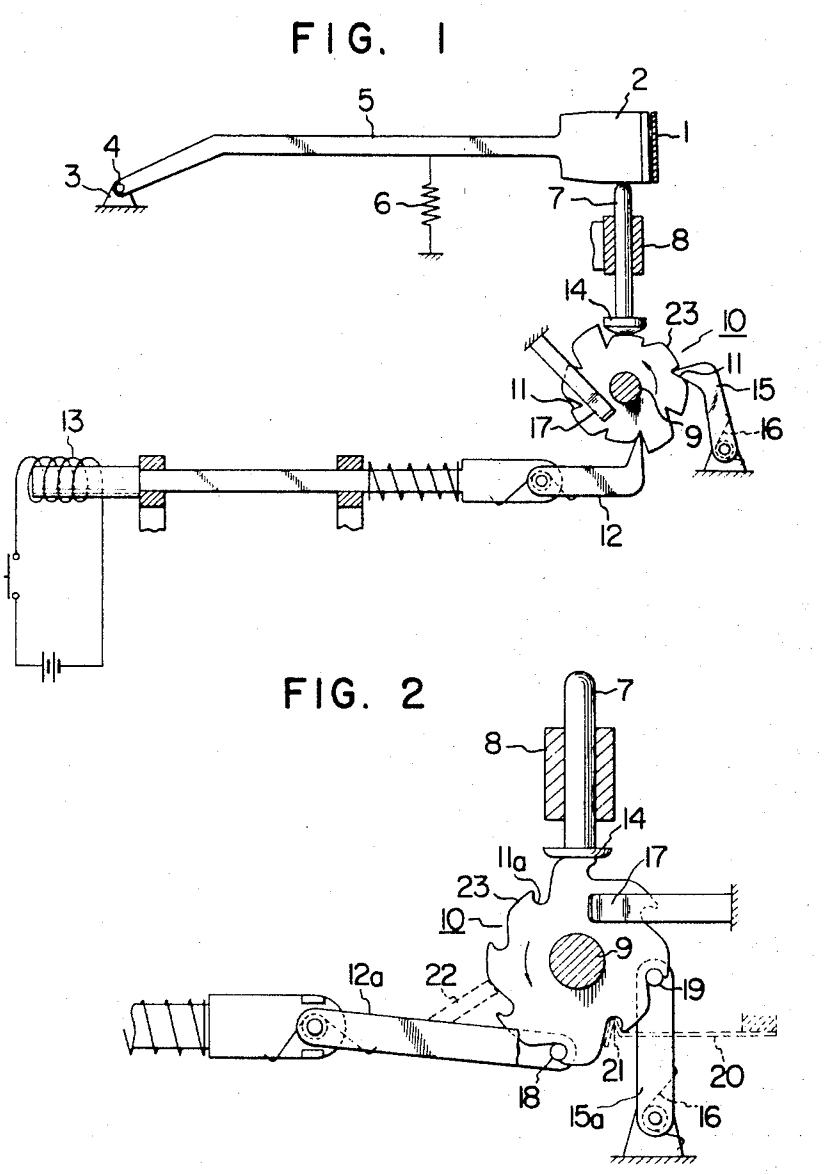

This invention relates to a apparatus for switching the position of a sound recording and/or reproducing head from one track to the other on a sound recording tape of a tape recorder, more particularly to an improved cam wheel for actuating said head.

A recording tape of a tape recorder usually includes a plurality of longitudinal sound tracks laterally spaced across the tape, and the position of a sound recording and/or reproducing head is selectively switched from one track to the other. For instance, where a plurality of different stereo tracks are recorded on the tape in closed spaced relation, it is required to precisely control the position of the head in order to accurately dispose it to oppose the desired sound track. Further, as it is desirable to miniaturize the tape recorder as far as possible, such apparatus must employ an operating mechanism of simple and compact construction and yet can operate accurately without any error.

It is therefore an object of this invention to provide an improved actuating mechanism of simple construction for the sound recording and/or reproducing head.

Another object of this invention is to provide a novel combined cam and ratchet wheel which can accurately positon the head with respect to a selected one of the sound tracks.

Further object of this invention is to provide a control means which can stepwisely rotate said combined cam and ratchet wheel and can accurately maintain it at the selected position.

According to this invention a cam wheel adapted to switch the position of the head is provided with a plurality of contact surfaces of different radial height and a plurality of notches each provided between a pair of adjacent contact surfaces whereby to constitute a combined cam and ratchet wheel, thus simplifying the construction. Further as in the conventional ratchet wheel a suitable stepping means and a detent means are provided. This arrangement simplifies the construction of the head actuating mechanism and can precisely position the head to oppose the selected sound track.

The invention can be more fully understood from the following description taken in connection with the accompanying drawing, in which:

FIG. 1 shows a side view of a device for raising and lowering a head of a tape recorder embodying this invention, and FIG. 2 shows essential parts of a modified device.

Referring now to FIG. 1 of the accompanying drawing a sound reproducing and/or recording head 2 (hereinafter, merely designated as a head) is disposed to oppose a selected one of sound tracks on a recording tape 1. The head 2 is mounted on one end of an arm 5 having its other end pivotally connected at 4 to a support 3, the arm 5 being biased in the clockwise direction, as viewed in FIG. 1, by means of a spring 6. The clockwise movement of the head 2 is resisted by a vertical rod 7 extending through a guide 8. Just beneath the rod 7 is disposed rotary a cam wheel 10 supported by a shaft 9 and including a number of contact surfaces of different radial height 23, the number of contact surfaces and their radial height respectively corresponding to the number of sound tracks and their transversal position across the tape. The circumferential lengths of respective contact surfaces are substantially equal. A letter V-shaped notch is provided between each pair of adjacent contact surfaces to cooperate with a feed pawl 12 actuated by a suitable reciprocating mechanism such as an electromagnet 13 and with a retaining pawl or detent 15 normally biased toward the cam 10 by means of a spring 16. In order to move smoothly the rod 7 from one contact surface to the other, a rod is formed with a rounded head 14 at its lower end. Further, in addition to the retaining pawl 15, a resilient restraining member 17 urging against one side of the cam wheel 10 may be provided to prevent the cam wheel from accidentally moving from set position.

In operation, when it is desired to switch the head 2 from one sound track to the other of the tape 1, the electromagnet 13 is energized repeatedly to move stepwisely the cam wheel 10 until a desired contact surface corresponding to the new track engages the head 14 of the rod 7. As is well known in the art the retaining pawl 15 permits counterclockwise rotation of the cam wheel 10 but prevents its clockwise rotation.

FIG. 2 shows a modification of the cam wheel 10 and its associated component. In this case portions corresponding to those of FIG. 1 are designated by the same reference numerals but with a suffix *a*. The notch 11*a* is shown as an open slot having a rounded inner end and extending at an angle with respect to the circumference of the cam wheel 10. The feed pawl 12*a* has been modified to include a pin 18 adapted to engage the notch or slot 11*a*. Likewise the retaining pawl 15*a* is formed with a pin 19. The operation of the embodiment shown in FIG. 2 is similar to that of FIG. 1. If desired, the retaining pawl 15*a* may be replaced by a leaf spring 20 having a catch 21 at its free end as shown by dotted lines in FIG. 2. Further, a projection 22 may be provided for the feed pawl 12*a* to prevent excessive counterclockwise rotation of the cam wheel 10 when it is actuated by the feed pawl 12*a*.

Thus, by providing notch 11 or slot 11*a* between each pair of adjacent contact surfaces of different radial height the cam wheel also acts as a ratchet wheel so that it is possible to eliminate separate ratchet wheel which has been required in the conventional design to operate stepwisely the cam wheel in order to switch the head from one sound track to the other, thus simplifying the construction. If a separate ratchet wheel is used the phase angle relation between the ratchet wheel and the cam wheel should be precisely controlled otherwise the relative position between the head and the selected sound track would become inaccurate.

While the invention has been shown and described in connection with some preferred embodiments thereof, the invention is not limited thereto and includes any modifications and alternations as fall within the true spirit and scope of this invention.

What is claimed is:

1. Apparatus for switching the position of a sound recording and/or reproducing head from one track to the other on a sound recording tape of a tape recorder, said apparatus comprising means to support said head to move across said tape, an actuating rod for said head, a single combined cam and ratchet wheel, said wheel including a plurality of contact surfaces of different radial height and adapted to operate said actuating rod to move said head from one tape track to another and a plurality of notches each provided between a pair of adjacent contact surfaces, feed means which cooperates with said notches to stepwisely rotate said single combined cam and ratchet wheel and a detent means normally biased against said wheel to selectively engage one of said notches.

2. The apparatus according to claim 1 wherein both of said feed means and detent means are in the form of a pawl.

3. The apparatus according to claim 1 wherein a resilient restraining member is urged against one side of said combined cam and ratchet wheel.

4. The apparatus according to claim 1 wherein said notches are in the form of a V-shaped notch.

5. The apparatus according to claim 1 wherein said notches are in the form of a slot.

References Cited

UNITED STATES PATENTS 2,468,198 4/1949 Heller.

FOREIGN PATENTS 1,282,179 1961 France.

LEONARD FORMAN, *Primary Examiner.*

R. A. FIELDS, *Assistant Examiner.*

U.S. Cl. X.R.

179—100.2